United States Patent
Abe

[19]

[11] Patent Number: 6,088,652
[45] Date of Patent: Jul. 11, 2000

[54] NAVIGATION DEVICE

[75] Inventor: Yuichi Abe, Tottori, Japan

[73] Assignees: Sanyo Electric Co., Ltd., Osaka-fu; Tottori Sanyo Electric Co., Ltd., Tottori-ken, both of Japan

[21] Appl. No.: 08/824,942

[22] Filed: Mar. 27, 1997

[30] Foreign Application Priority Data

| Mar. 29, 1996 | [JP] | Japan | 8-076834 |
| Jan. 28, 1997 | [JP] | Japan | 9-014202 |
| Jan. 31, 1997 | [JP] | Japan | 9-019127 |
| Jan. 31, 1997 | [JP] | Japan | 9-019128 |
| Jan. 31, 1997 | [JP] | Japan | 9-019129 |
| Jan. 31, 1997 | [JP] | Japan | 9-019130 |

[51] Int. Cl.[7] ............................................. G06F 165/00
[52] U.S. Cl. ........................... 701/208; 701/211; 340/995
[58] Field of Search .................................. 701/207, 208, 701/210, 211; 340/990, 995

[56] References Cited

U.S. PATENT DOCUMENTS

| 4,550,317 | 10/1985 | Moriyama et al. | 340/995 |
| 4,882,696 | 11/1989 | Nimura et al. | 701/211 |
| 4,937,572 | 6/1990 | Yamada et al. | 340/995 |
| 5,117,363 | 5/1992 | Akiyama et al. | 701/208 |
| 5,157,614 | 10/1992 | Kashiwazaki et al. | 701/200 |
| 5,398,188 | 3/1995 | Maruyama | 701/208 |
| 5,450,343 | 9/1995 | Yurimoto et al. | 701/208 |
| 5,537,324 | 7/1996 | Nimura et al. | 340/990 |
| 5,539,429 | 7/1996 | Yano et al. | 345/173 |
| 5,587,911 | 12/1996 | Asano et al. | 701/202 |
| 5,638,279 | 6/1997 | Kishi et al. | 340/995 |
| 5,784,059 | 7/1998 | Morimoto et al. | 345/353 |
| 5,790,975 | 8/1998 | Kashiwazaki et al. | 701/208 |
| 5,877,751 | 3/1999 | Kanemitsu et al. | 345/173 |

FOREIGN PATENT DOCUMENTS

| 0 440 105 A2 | 1/1991 | European Pat. Off. . |
| 0 703 525 A1 | 3/1996 | European Pat. Off. . |
| 43 27 780 A1 | 3/1994 | Germany . |
| 63-223585 | 9/1988 | Japan . |
| 4-127015 | 4/1992 | Japan . |
| 5-46090 | 2/1993 | Japan . |
| 5-53500 | 3/1993 | Japan . |
| 5-84975 | 11/1993 | Japan . |
| 06309429 | 11/1994 | Japan . |

*Primary Examiner*—Tan Nguyen
*Attorney, Agent, or Firm*—Akin, Gump, Strauss, Hauer & Feld, L.L.P.

[57] ABSTRACT

In a navigation device, the map information read by a map information reproduction device is displayed on the display device, and an intersection which the vehicle approaches is enlarged. The enlarged display of an intersection is continued if the speed of the vehicle is not more than a predetermined value even when the disk is moving away from the intersection. A place at which the classification of road changes may be treated like an intersection. An exclusion key may be provided for designating, during simulation, an intersection to be excluded from the enlarged display. During simulation, the vehicle may be slowed, or stopped when it is near an intersection to permit full examination. A multi-disk reproduction device may be used to selectively reproduce map information from a first disk for storing map information of a first area, and a second disk for storing map information of a second area. If, in the state in which the first disk is selected, the vehicle moves to the second area, the disk storing map information of the second area is automatically selected.

6 Claims, 10 Drawing Sheets

NAVIGATION DEVICE

BACKGROUND OF THE INVENTION

The present invention relates to a navigation device for performing enlarged display of an intersection.

The present invention also relates to a navigation device for performing guidance of a route.

The present invention also relates to a navigation device capable of reproduction through selection from a plurality of storage media which store map information.

It is important for a navigation system mounted on a vehicle to provide information about intersections. As one of the methods of providing this information, enlarged display of an area near the intersection (fork) a vehicle is approaching is disclosed in Japanese Unexamined Patent Publication 4-127015.

In this method of performing enlarged display of the intersection, when a vheicle approaches to within a predetermined distance of the intersection, the enlarged display of the intersection is initiated, and when the vehicle moves away from the intersection, the enlarged display is terminated.

However, when a current position detector position measurement errors, the enlarged display may intermittently appear and disappear while a vehicle is making a temporary stop near a boundary at which the enlarged display of the intersection is to be initiated. In the case of GPS position detector by which radio waves are received from the GPS (Global Positioning System) satellites, the error in the position measurement may lead to an error in the speed measurement of substantially two kilo meters per hour at the maximum. For this reason, when a vehicle makes a temporary stop due to a traffic jam near a boundary at which the enlarged display is to be initiated, the enlarged display may intermittently appear and disappear. This is not satisfactory.

Further, when there is the error in the position measurement, even while the vehicle is making a stop at the intersection, erroneous determination that the vehicle is moving away is sometimes made. It sometimes happens, for example, when an enlarged view of an intersection is not provided while waiting for the traffic lights to change.

Moreover, the enlarged display of an intersection (giving details of the intersection) is carried out automatically with the movement of the vehicle, and the information is not obtained readily when the user desires it at other times.

Another navigation device disclosed in Japanese Utility Model Kokal Publication 5-84975 has a route guidance function. The user sets a planned route by entering a starting point, a destination, and one ore more points on the route as required prior to the actual travel, and display of the set route, guidance for turning by voice, and the like are performed during the actual travel. In addition, recognition or examination of the route by means of simulation can also be performed.

Another navigation device disclosed in Japanese Patent Kokai Publication 5-53500 combines the function of enlarged display of an area near an intersection (fork) with the function of route guidance.

However, there are places where classification of road changes. In Japan, for example, the roads are classified into eight classifications, namely: automotive expressways, metropolitan expressways, national highways, principal local roads, prefectural roads, standard roads having a width of 5.5 m or more, other roads (narrow roads), and ferry routes. The place where this classification of roads changes may be a boundary of prefectures or cities, a boundary at which the restrictions of the road traffic law such as one on speed limits change, or a boundary at which a condition of a road such as the width of a road, the number of lanes, or the type of surface changes.

Since a navigation device for notifying or emphasizing the classification of roads was not available in the past, the above-mentioned boundary could not be known in advance.

Another problem is that enlarged display is performed for all the intersections. However, enlarged display of an intersection which the user does not want only reduces the useful range of the display screen.

A further problem is that the time for which the enlarged display is made during simulation is sometimes insufficient for the recognition or examination of an intersection, particularly when the vehicle is moving fast.

Thus, intersections which need not be enlarged are also enlarged, and intersections which need to be enlarged for recognition or examination cannot be enlarged for a sufficient time.

Yet another problem of the prior art navigation device is that the cursor on the display must be moved to a desired position to set a starting point or a destination.

For instance, the current position which is detected according to the position information by a GPS (Global Positioning System) receiver is automatically stored as the starting point. However, when the vehicle is not moving, map matching is not effected, and the error in the detection of the current position is substantial, with the result that the position needs to be corrected by manually moving the cursor. Moreover, when the current position is not the starting point, it is necessary to designate the starting position by moving the cursor.

The designation of the destination position by moving the cursor is troublesome particularly for a user who often makes his/her home as the starting point or the destination.

In yet another navigation device disclosed in Japanese Unexamined Patent Publication 5-46090, map information and service information are stored, being divided into a plurality of disks. It has been conceived that these plurality of disks are inserted into a multi-disk reproduction device, and the disk which stores map information about the current position is selected.

However, many disks storing map information of a certain area also store map information of adjacent areas as well, and it sometimes happens that this map information of the adjacent areas is displayed. For example, a disk storing primarily map information of Germany also stores map information of parts of France which are adjacent to Germany. However, this map information of France stored in the disk for Germany is not as detailed as the map information of Germany. For example, express ways are stored, but ordinary roads are not be stored.

It therefore happens with a conventional navigation device, that when a vehicle moves from a German territory to a French territory, a German disk is still reproduced although there is a French disk, with the result that detailed map information or service information cannot be obtained.

SUMMARY OF THE INVENTION

An object of the invention is to prevent erroneous termination of enlarged display of an intersection due to an error of a position detector while the vehicle is making a temporary stop near the intersection.

Another object of the invention is to allow enlarged display of an intersection when the user desires it.

Another object of the invention is to enable enlarged display of a boundary at which classification of road changes.

Another object of the invention is to limit enlarged display to intersections desired to be enlarged by the user, and to prevent reduction of the useful range of the screen display due to enlarged display of undesired intersections.

Another object of the invention is to facilitate designation of the position of the starting point or the destination of a planned route.

Another object of the invention is to ensure that detailed information map information and service information are always provided regarding the current position of the vehicle.

According to the invention, there is provided a navigation device comprising:

- a current position detector for detecting a current position of a vehicle;
- a map information reproduction device for reading map information from a medium which stores the map information;
- a display device; and
- a control circuit for causing the map information read by the map information reproduction device to be displayed on the display device, initiating enlarged display of an intersection of which the vehicle approaches to within a predetermined distance, and terminating the enlarged display when a predetermined condition has been satisfied;
- wherein the control circuit continues the enlarged display of the intersection if the speed of the vehicle is not more than a predetermined value, even though the predetermined condition has been satisfied.

According to another aspect of the invention, there is provided a navigation device comprising:

- a current position detector for detecting a current position of a vehicle;
- a map information reproduction device for reading map information from a medium storing the map information;
- a display device;
- a control circuit for directing display of the map information read from the map information reproduction device and the current position detected by the current position detector on the display device; and
- an intersection display key;
- wherein the control circuit directs enlarged display of an intersection lying ahead on a road on which the vehicle is moving, based on an operation of the intersection display key.

According to another aspect of the invention, there is provided a navigation device comprising:

- a current position detector for detecting a current position of a vehicle;
- a map information reproduction device for reading map information from a medium storing the map information;
- a display device;
- a control circuit for directing display of the map information read from the map information reproduction device and the current position detected by the current position detector on the display device; and
- a scroll key for scrolling a display screen in a designated direction;
- wherein the control circuit directs scrolling of the screen based on an operation of the scroll key, and directs enlarged display of an intersection positioned within a predetermined range of the screen by the scrolling.

According to another aspect of the invention, there is provided a navigation device comprising:

- a current position detector for detecting a current position of a vehicle;
- a map information reproduction device for reading map information from a medium storing the map information;
- a display device; and
- a control circuit for directing display of the map information read from the map information reproduction device and the current position detected by the current position detector on the display device;
- an intersection display key; and
- a voice generator for generating voice about a distance;
- wherein the control circuit directs notification by voice of the distance to an intersection lying ahead on a road on which the vehicle is moving, based on an operation of the intersection display key.

According to another aspect of the invention, there is provided a navigation device comprising:

- a current position detector for detecting a current position of a vehicle;
- a map information reproduction device for reading map information from a medium storing the map information including information about classified roads;
- a display device; and
- a control circuit for directing display of the map information read from the map information reproduction device and the current position detected by the current position detector on the display device;
- wherein
  - when a boundary with a road of other classification lies ahead in a moving direction of the vehicle, the control circuit directs enlarged display of the boundary when the vehicle has come closer to within a predetermined distance of the boundary.

According to another aspect of the invention, there is provided a navigation device comprising:

- a current position detector for detecting a current position of a vehicle;
- a map information reproduction device for reading map information from a medium storing the map information;
- storage means for storing a planned route;
- a display device;
- a control circuit for directing a route guidance display operation of displaying the map information read from the map information reproduction device, the planned route stored in the storage means, and the current position detected by the current position detector on the display device, a simulated travel display operation of displaying the planned route to be stored in the storage means and a virtual current position on the planned route on the display device with a predetermined procedure and a predetermined speed, and enlarged display of an intersection in a position of the vehicle near the intersection during the route guidance display operation and the simulated travel display operation; and
- an exclusion key for designating, during the simulated travel display operation, an intersection to be excluded from the enlarged display;

wherein, during the route guidance display operation, the control circuit does not direct enlarged display of the intersection designated by the exclusion key at the time of the simulated travel display operation.

According to another aspect of the invention, there is provided a navigation device comprising:

storage means for storing a planned route;

a display device; and a control circuit for directing a simulated travel display operation of displaying the planned route to be stored in the storage means and a virtual current position on the planned route on the display device with a predetermined procedure and a predetermined speed, and enlarged display of an intersection at the time when the vehicle is near the intersection during the simulated travel display operation, wherein during the enlarged display of the intersection the control circuit directs lowering of the moving speed of or temporary stopping of the vehicle during the simulated travel display operation.

According to another aspect of the invention, there is provided a navigation device comprising:

first storage means for storing a planned route including at least a starting point and a destination;

second storage means for storing a user's home position;

a user's home key; and a control circuit for directing storage of the user's home position stored in the second storage means in the first storage means as the starting point or the destination when the user's home key is operated.

According to another aspect of the invention, there is provided a navigation device comprising:

a storage medium reproduction device reproducing map information stored in either of a first storage medium for storing map information about a first area, and a second storage medium for storing map information about a second area adjacent to the first area, through selection between the first storage medium and the second storage medium;

a position detector for detecting a current position;

a display device; and a control circuit for causing the display device to display map information reproduced by the storage medium reproduction device and the current position detected by the position detector;

wherein, when the current position of the vehicle moves from the first area to the second area, the control circuit switches from the first storage medium to the second storage medium to begin reproduction from the second storage medium.

According to another aspect of the invention, there is provided a navigation device comprising:

a storage medium reproduction device reproducing map information stored in either of a first storage medium for storing map information about a first area, and a second storage medium for storing map information about a second area adjacent to the first area, through selection between the first storage medium and the second storage medium, said map information being stored in a form divided into blocks;

a position detector for detecting a current position;

a display device; and a control circuit for causing the display device to display map information reproduced by the storage medium reproduction device and the current position detected by the position detector;

wherein the first and second storage media store, for each of the blocks, a classification code for identifying whether said each of the blocks belongs entirely to the first area, or entirely to the second area;

when the control circuit finds that, in the state in which the first storage medium is selected, the current position of the vehicle has moved to the second block based on the detection of the classification code for the current position, the control circuit switches from the first storage medium to begin reproduction from the second storage medium.

DETAILED DESCRIPTION OF THE PREFERRED EMBODIMENTS

Embodiments of the invention will now be described with reference to the drawings.

Figure 1:
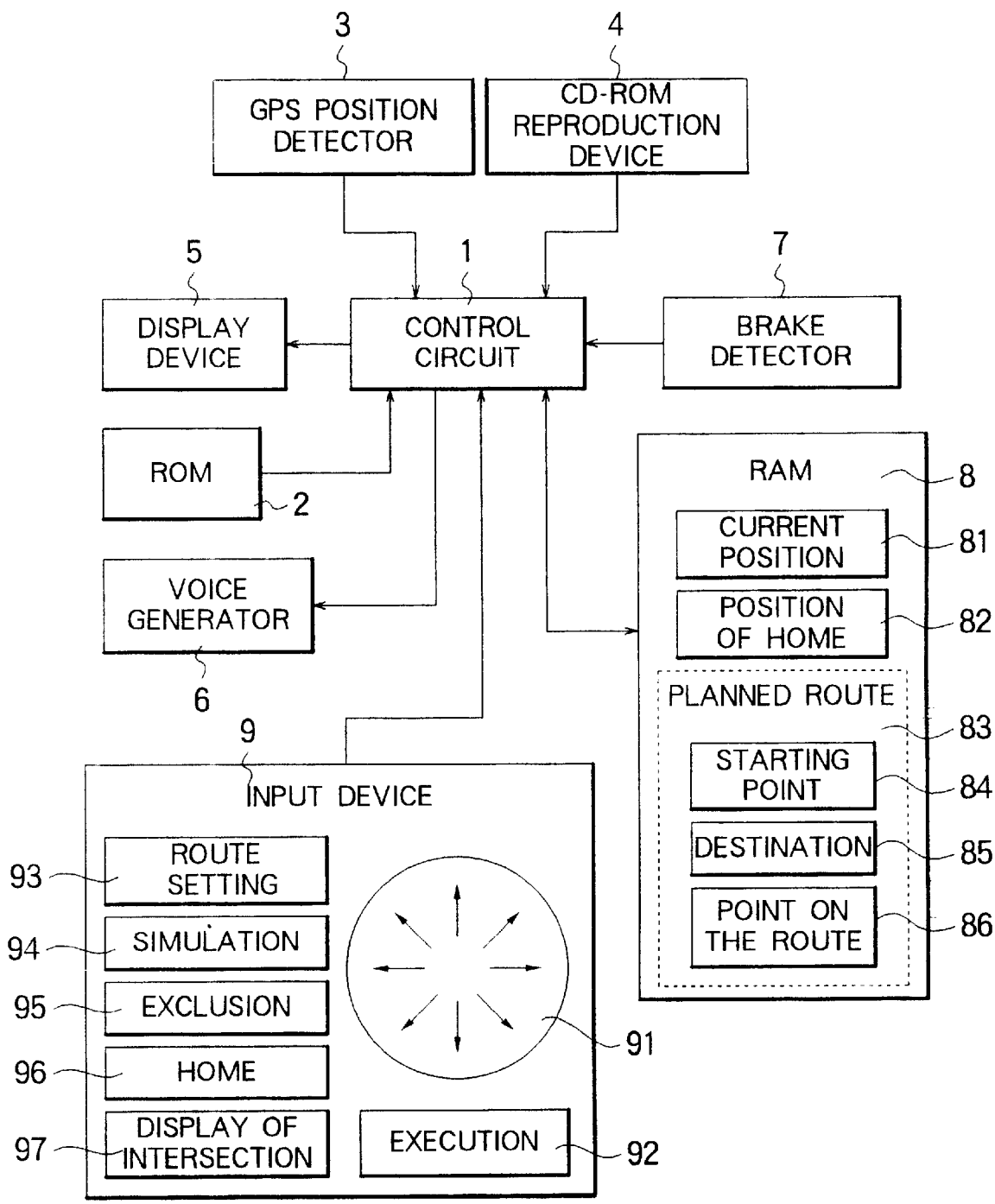
FIG. 1 is a block diagram showing the pertinent part of a first embodiment of the present invention.

FIG. 1 is a block diagram showing the pertinent part of a first embodiment of the present invention. A control circuit 1 operates according to the programs stored in a ROM 2 and exercises control over the entire device. A GPS position detector 3 receives radio waves from the GPS satellites, measures the current position, and supplies the measurement data to the control circuit 1. A CD-ROM reproduction device 4 reads map information from a CD-ROM on which map information is written and supplies it to the control circuit 1. A display device 5 displays a map, the current position, and the like under the control of the control circuit 1. A voice generator 6 generates voice for guiding the route, etc. under the control of the control circuit 1. A brake detector 7 is connected to the parking brake line of a vehicle, detects whether or not the parking brake is operating, and supplies the result to the control circuit 1.

Reference numeral 8 indicates a RAM, which stores data needed for the operations of the control circuit 1 such as, for example, a current position (81), a position of the user's home indicated by reference numeral (82), a starting point (84), the position of a destination (85), and a point on the route (86) of a planned route (83).

An input device 9 includes a scroll key 91 for scrolling the display in eight directions, an execution key 92 for executing data output to the control circuit 1, a route setting key 93 for setting a planned route, a simulation key 94 for directing simulation, an exclusion key 95 for excluding an undesired intersection from the enlarged display during the simulation, a user's home key 96 for designating the user's home as the starting point or the destination, and an intersection display key 97 for directing enlarged display of an intersection even when the vehicle is not coming closer to it.

The fundamental operation of the system, i.e., reception of GPS radio waves and display of the current position of a vehicle on the map is next described.

The detection of the current position is performed by the GPS position detector 3. When the power switch of the navigation device is turned ON for the first time, it takes several minutes to detect the position. However, when the position is detected continuously, new positional data is obtained at every second. After receiving new positional data, the control circuit 1 stores this data in the current position storage region 81 in the RAM 8 and updates the data. Then, the control circuit 1 updates the current position on the map displayed on the display device 5.

Before the vehicle starts moving, it often happens that the current position is not located on the road due to an error of the GPS. When the vehicle begins moving, the distances to respective roads taking account of the moving direction are calculated, and by comparing these, one of the roads which the vehicle is most likely to be on is selected, and the data representing the position of the vehicle as stored in the RAM 8 is corrected to represent this position on the selected road, and the indication of the position of the vehicle on the display is moved onto the selected road. This operation is called map-matching.

Figure 2:
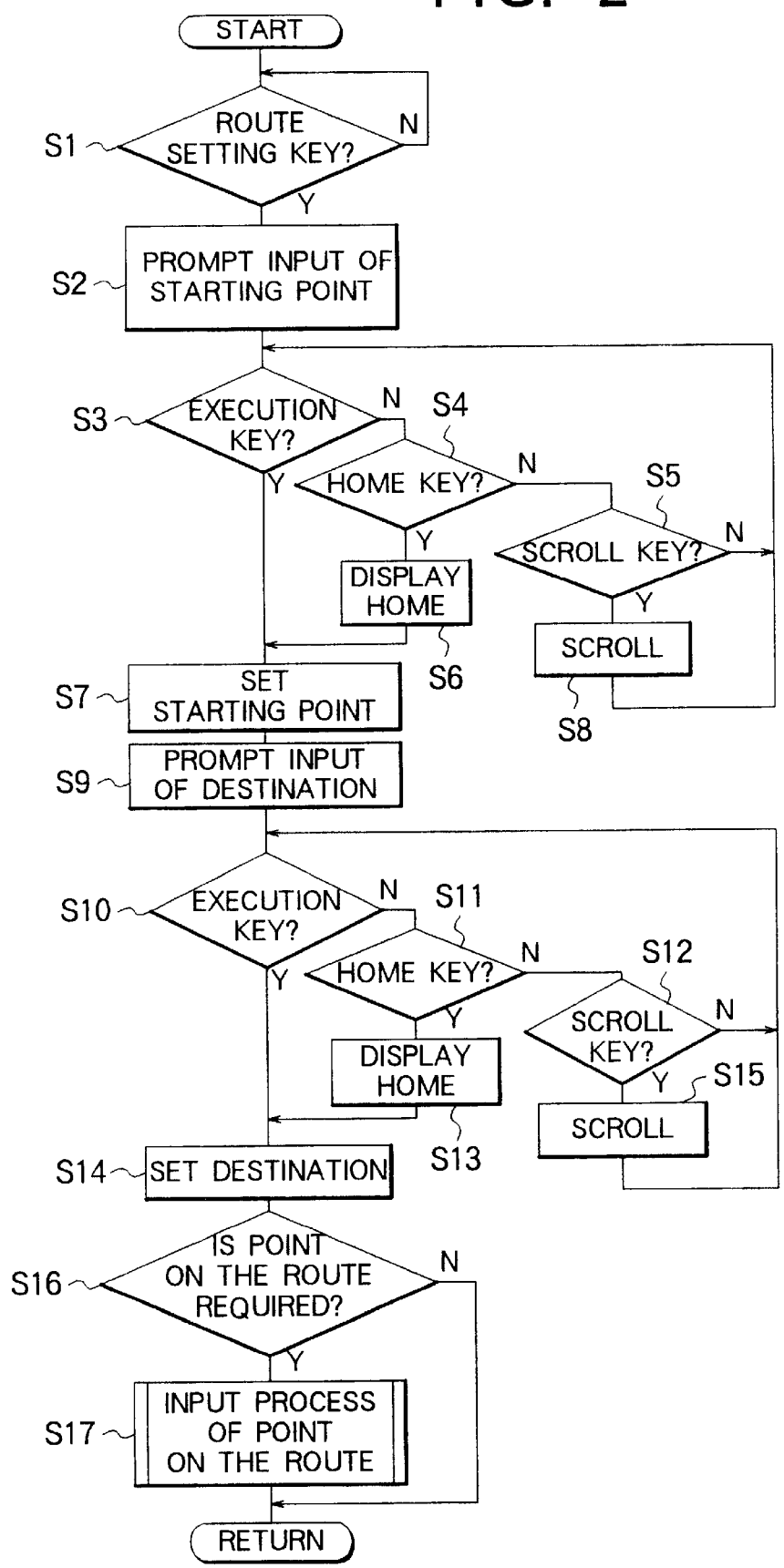
FIG. 2 is a flow chart showing the route setting operation of a control circuit according to the first embodiment.

Next, the planned route setting operation is described. FIG. 2 is a flow chart showing the operation of the control circuit 1.

When the route setting key 93 is depressed (S1), the control circuit 1 displays on the display device 5 a message prompting input of the starting point, such as "Enter the starting point." and a cross-shaped cursor representing the starting point (S2). Then, the control circuit comes into a waiting state in which it waits for input by the execution key 92, the user's home key 96, and the scroll key 91 (N at S3, N at S4, and N at S5).

When the user's home key 96 is depressed, the position of the user's home which has been stored in advance by the input of the user is read from the RAM 8, the user's home is displayed (S6), and the position of the user's home is stored in the starting point storage region 84 in the RAM 8 (S7).

When the starting point is not at the user's home, the display is scrolled by the operation of the scroll key 91 and the cursor is moved to the position which is desired to be the starting point (Y at S5, S8), and the execution key 92 is depressed (Y at S3). Then, the control circuit 1 stores in the starting point storage region 84 in the RAM 8 the position of the cursor at the time when the execution key 92 is depressed (S7).

After the operation of S7, the control circuit 1 displays a message prompting the input of the destination, such as "Enter the destination." and the cross-shaped cursor representing the destination onto the display device 5 (S9). Then, in the manner similar to that with the input of the starting point (S3–S7), using a one-touch operation by means of the user's home key 96 or the scroll operation, the designated position is stored in the destination storage region 85 (S10–S15).

Then, the control circuit displays a query as to whether or not input of one or more points on the route between the starting point and the destination is required. If it is required, the control circuit performs the process of the point on the route input and stores the point on the route onto the storage region of the point on the route in the RAM 8 (S16, S17).

Figure 3:
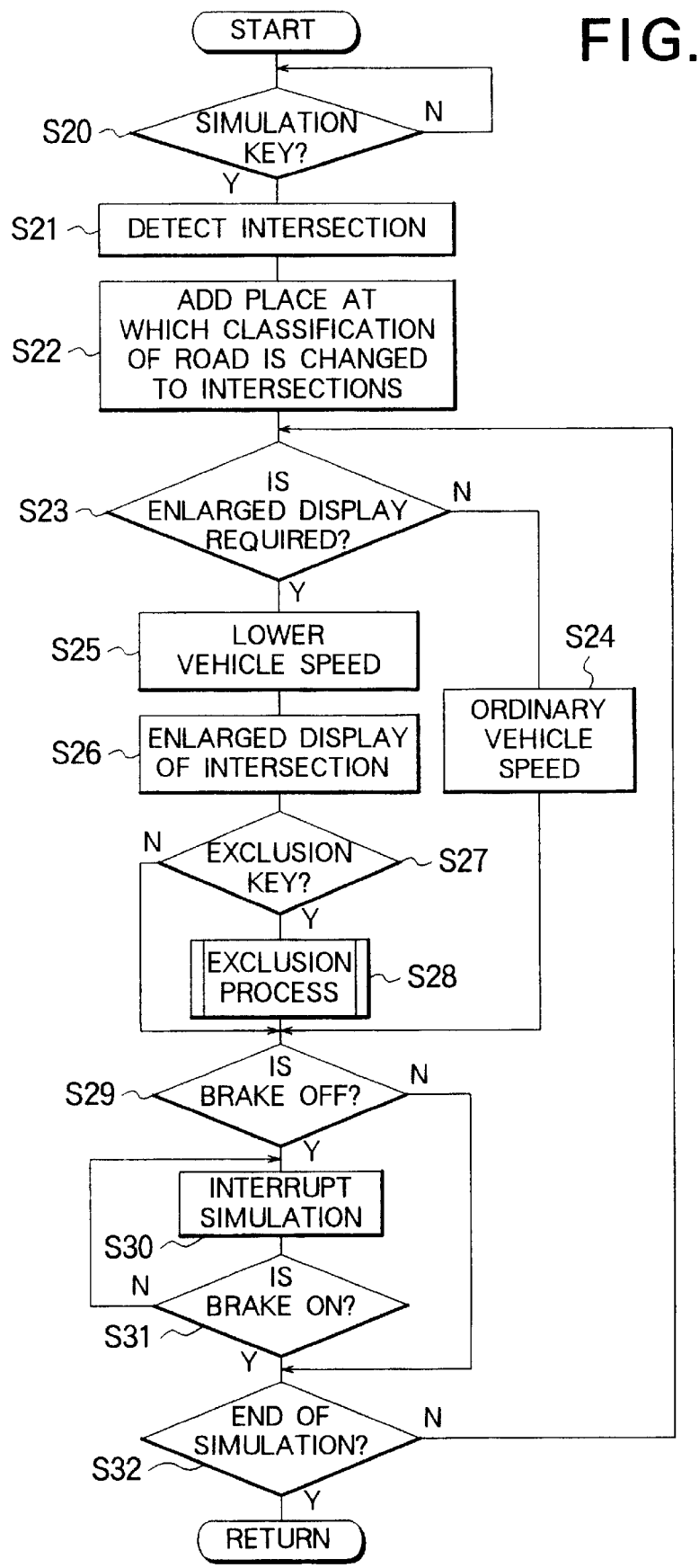
FIG. 3 is a flow chart showing the simulating operation of a control circuit according to the first embodiment.

Next, the simulation, which is an operation for recognizing (or examining) the set route, is described. FIG. 3 is a flowchart showing the operation of the control circuit 1.

When the simulation key 94 is depressed (Y at S20), the planned route 83 stored in the RAM 8 is read out, and the intersections in this route are detected (S21). The places at which the classification of the road changes are treated in the same way as the intersections (S22). This classification of the roads is written on the CD-ROM, and roads are classified into eight classes: automotive expressways, metropolitan expressways, national highways, principal local roads, prefectural highways, standard roads having a width of 5.5 m or more, other roads (narrow streets), and ferry routes. The place at which the width of a road changes is treated like an intersection.

Next, a vehicle is subject to a simulated travel from the starting point to the destination at a predetermined speed. It is checked whether there is an intersection to which the vehicle is coming closer and whether it is within a predetermined distance. That is, it is checked whether to select the mode of enlarged display of the intersection (S23). If the enlarged display mode is not selected, the display is continued without enlargement and without changing the vehicle speed (S24), and the procedure proceeds to S29. If the enlarged display is selected, the enlarged display is performed, and the vehicle speed is lowered (S25, S26).

If the exclusion key 95 is depressed, a flag indicating the exclusion is set for the intersection (or the places where the classification of road changes) being displayed (S27, S28). The intersection with this flag being set will not be displayed in the enlarged state during actual travel.

Further, it is checked whether or not the parking brake is operating. While the parking brake is not operating, the simulation is interrupted (S29–S31).

The above-mentioned operations are performed until the vehicle reaches the destination (S32).

In this way, the time for the recognition or examination of the intersection can be made sufficiently long without being restricted by the normal speed of the vehicle. Moreover, this gives the user sufficient time for consideration as to whether the enlarged display is to be effected for the intersection in question during actual travel (whether to designate the intersection as one which does not require enlarged display during the actual travel).

Figure 4:
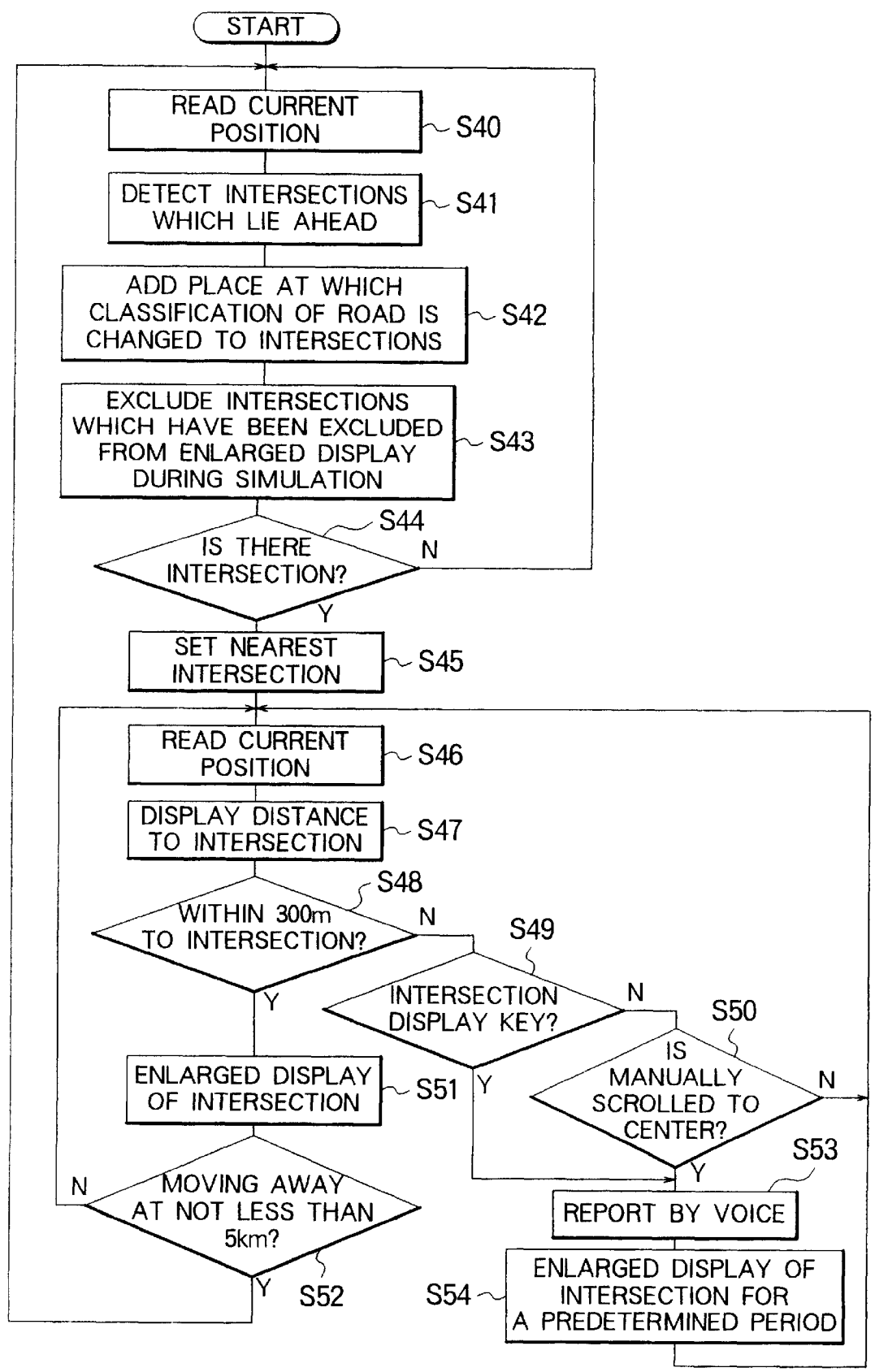
FIG. 4 is a flow chart showing the enlarged display operation of an intersection by a control circuit according to the first embodiment.

Next, the operations during the actual travel of a vehicle are described. FIG. 4 is a flowchart showing the operations of the control circuit 1.

The control circuit 1 reads the current position from the current position storage region 81 in the RAM 8 (S40). Based on the position which has been read, intersections which lie ahead in the route are detected (S41). The places at which the classification of the roads is changed are added to the intersections (S42), and the intersections (or the places at which the classification of road changes) which have been excluded from the enlarged display during the simulation are excluded (S43). If there are intersections obtained in this way (Y at S44), the intersection that lies ahead and is the closest to the current position is set to the intersection to be displayed in the enlarged state (S45). The current position is read again, and the distance to the intersection is calculated and displayed on the display (S46, S47).

Then, it is checked whether the distance to the intersection which has been set is within 300 meters (S48), whether the intersection display key 97 is depressed (S49), and the intersection which lies ahead has been manually scrolled up to the predetermined central region on the display (S50). If all of the answers are NO, the procedure is returned to S46.

When the distance to the intersection which has been set is within 300 meters at S48, the enlarged display of the intersection is performed (S51). Thereafter, it is checked whether the vehicle is moving away from the intersection which has been set at not less than five kilometers per hour (S52). If the answer is "NO", the procedure is returned to S46. If the answer is "YES", the procedure is returned to S40.

When the intersection display key 97 is depressed at S49, the distance to the intersection which has been set is reported by the voice generator 6 (S53), the enlarged display of the intersection is performed for a predetermined time period (S54), and the procedure is returned to S46.

When the intersection which lies ahead is manually scrolled up to the predetermined central region on the display at S50, the distance to the intersection which lies ahead is reported by the voice generator 6 (S53), the enlarged display of this intersection is performed for a predetermined time period (S54), and the procedure is returned to S46.

As described above, enlarged display is performed for a place at which the classification of road changes as well as an intersection (fork). That is, a place where the width of the road changes, for example is also treated like an intersection.

The current position detector according to this embodiment uses the GPS radio waves. This has an an error in the position measurement leading to an error in speed measurement of substantially two kilo meters at the maximum. For this reason, until now, while a vehicle is making a temporary stop near a boundary at which the vehicle initiates the enlarged display of the intersection, the enlarged display may intermittently appear and disappear. In addition, it sometimes happens that, when one wishes to look down at the enlarged diagram of an intersection while waiting for the traffic lights to change, he cannot do so because enlarged display is not performed due to erroneous recognition that the vehicle is moving away from the intersection.

According to the present invention, enlarged display of an intersection is terminated when a vehicle is moving away from the intersection at not less than a predetermined speed (five kilometers per hour), and an erroneous termination of the enlarged display of the intersection due to an error of the position detector can be thereby prevented.

Although the user's home key 96 is used for setting the starting point or the destination in the above-mentioned embodiment, it may also or alternatively be used for setting a point on the route.

According to the embodiment described, erroneous termination of the enlarged display of an intersection due to an error of the position detector can be prevented.

Moreover, by depressing a predetermined key associated with the information about an intersection or moving the intersection to a predetermined position on the screen by means of a cursor, enlarged display of the intersection and notification of a distance to the intersection by voice can be carried out. That is, detailed information about an intersection can be given when the user desires it.

Furthermore, enlarged display of a boundary at which classification of roads changes is performed. Accordingly, information about a boundary of prefectures or cities, a boundary at which the restrictions of the road traffic law such as one on speed limits change, and a boundary at which a road condition such as the road width, the number of lanes, or the type of surface changes can be obtained advance.

In addition, enlarged display is effected only for the intersections which the user wants to examine in detail. For this reason, the useful range of the display screen will not be reduced due to enlarged display of undesired intersections.

During the actual travel, the display must follow the current position of a vehicle, so that the time for the enlargement of an intersection is limited. During the simulation, this limitation is not imposed. Thus, by lowering the moving speed of or by temporarily stopping the vehicle during the enlarged display of the intersection, in a simulation, the time for the enlargement of the intersection can be made sufficiently long. This gives the user sufficient time for consideration as to whether the enlarged display is to be effected for the intersection in question during actual travel (whether to designate the intersection as one which does not require enlarged display during the actual travel).

In addition, setting of the user's home position can be performed by depressing the user's home key, i.e., without moving the cursor.

Figure 5:
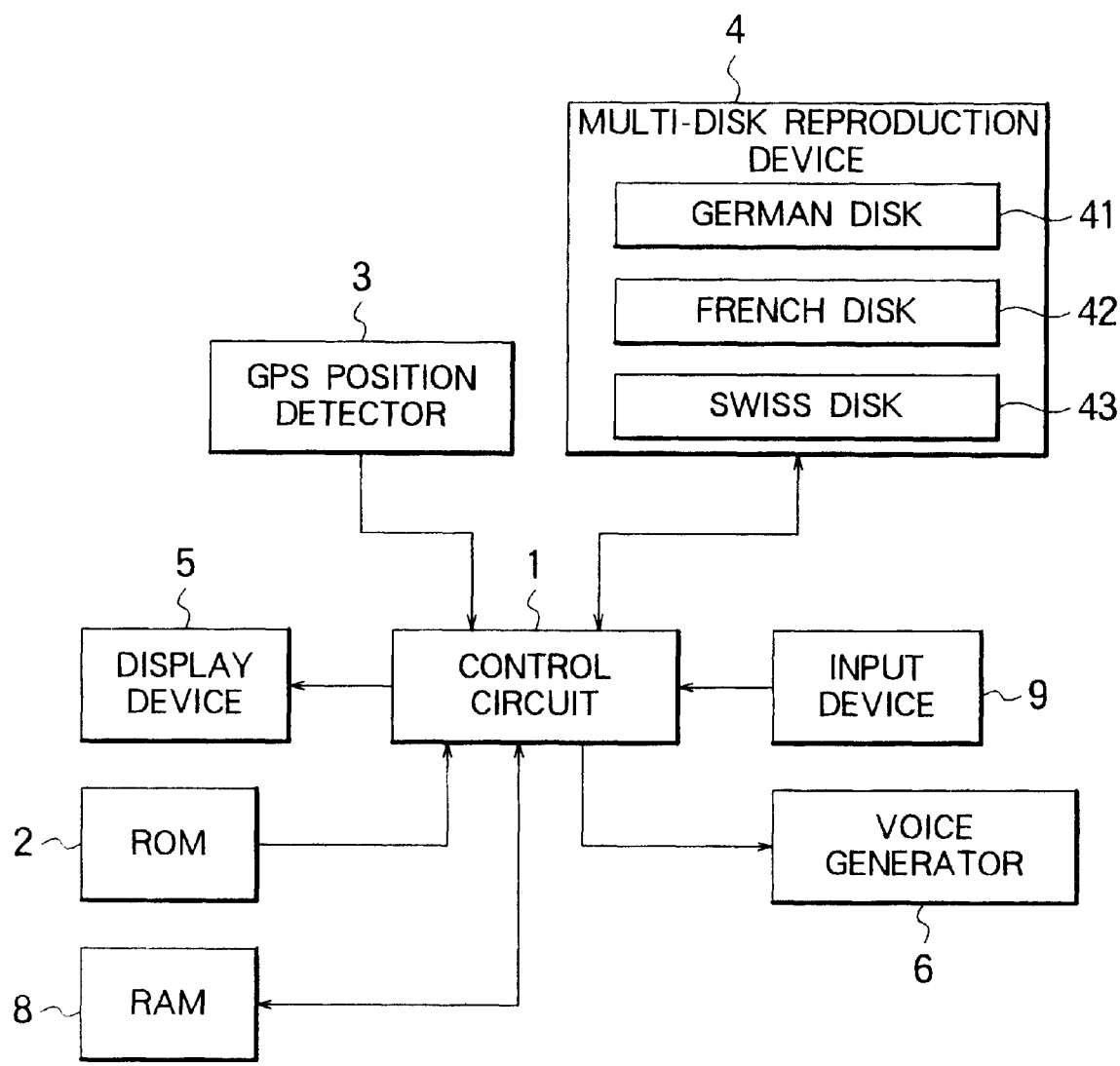
FIG. 5 is a block diagram showing the pertinent part of a second embodiment of the present invention.

FIG. 5 is a block diagram showing a pertinent part of a second embodiment according to the present invention. Reference numerals identical to those in FIG. 1 denote identical or corresponding members. As in the first embodiment, a control circuit 1 operates according to the programs stored in a ROM 2 and exercises control over the entire device. A GPS position detector 3 receives radio waves from GPS satellites, measures the current position, and supplies data of the measurement to the control circuit 1.

A CD-ROM reproduction device 4 of this embodiment is a multi-disk reproduction device in which a plurality of disks storing map information of different regions can be mounted. In the example illustrated, a German disk 41, a French disk 42, and a Swiss disk 43 which respectively store map information of Germany, France and Switzerland are inserted. The country number "1" is written into the German disk 41. The country number "2" is written into the French disk 42, and the country number "3" is written into the Swiss disk 43. The multi-disk reproduction device 4 reads this country number, supplies it to the control circuit 1, and selects a disk containing the country number designated by the control circuit 1.

Figure 6:
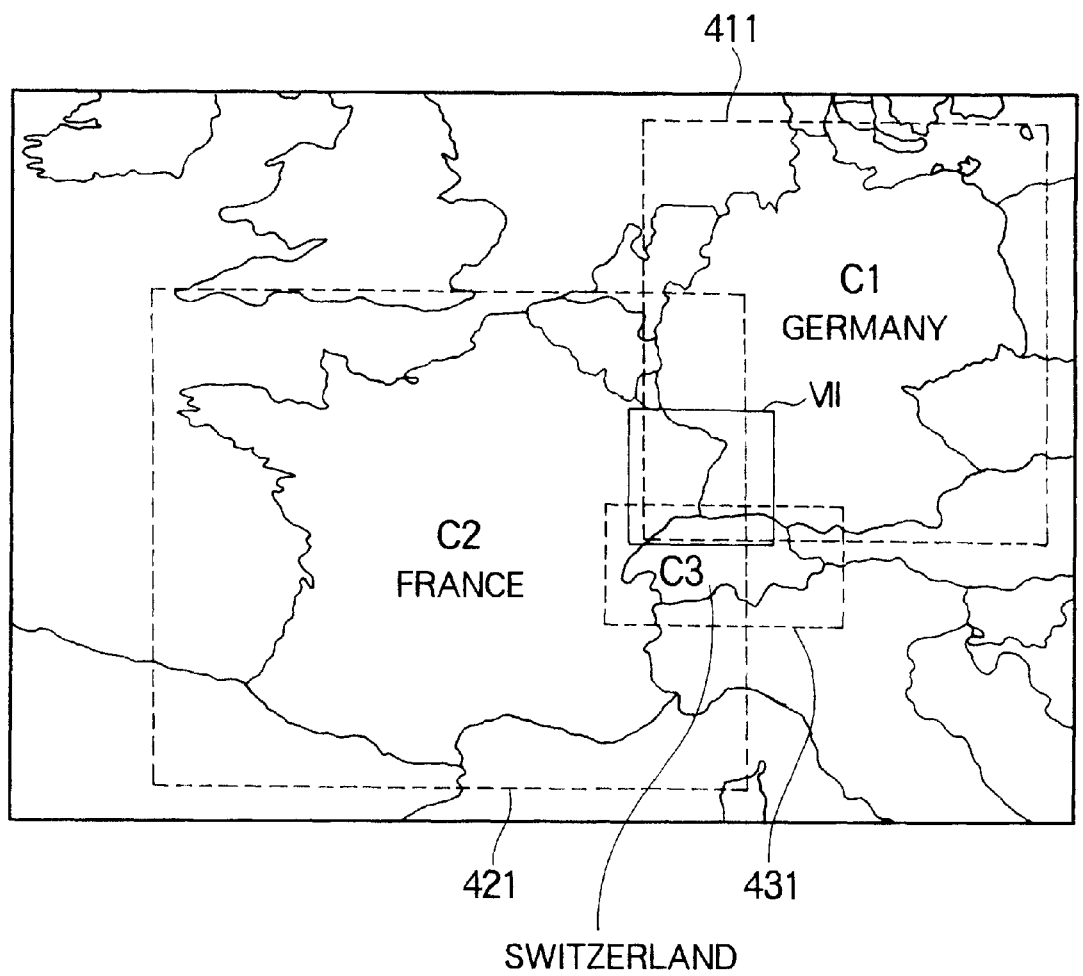
FIG. 6 is a drawing showing regions stored in the disks of the respective countries.

As shown in FIG. 6, the German disk 41 stores not only map information 411 of German territory C1 as a primary part, but also map information 421 and 431 of adjacent countries such as the French territory C2 and the Swiss territory C3 (as well as adjacent regions of other countries) as secondary parts. Map information contains service information about accommodations and sight-seeing as well as roads. The map information of the region as a primary part (the map information of the German territory in the case under consideration) is more detailed than the map information of the adjacent regions as secondary parts (the map information of French and Swiss territories).

Figure 7:
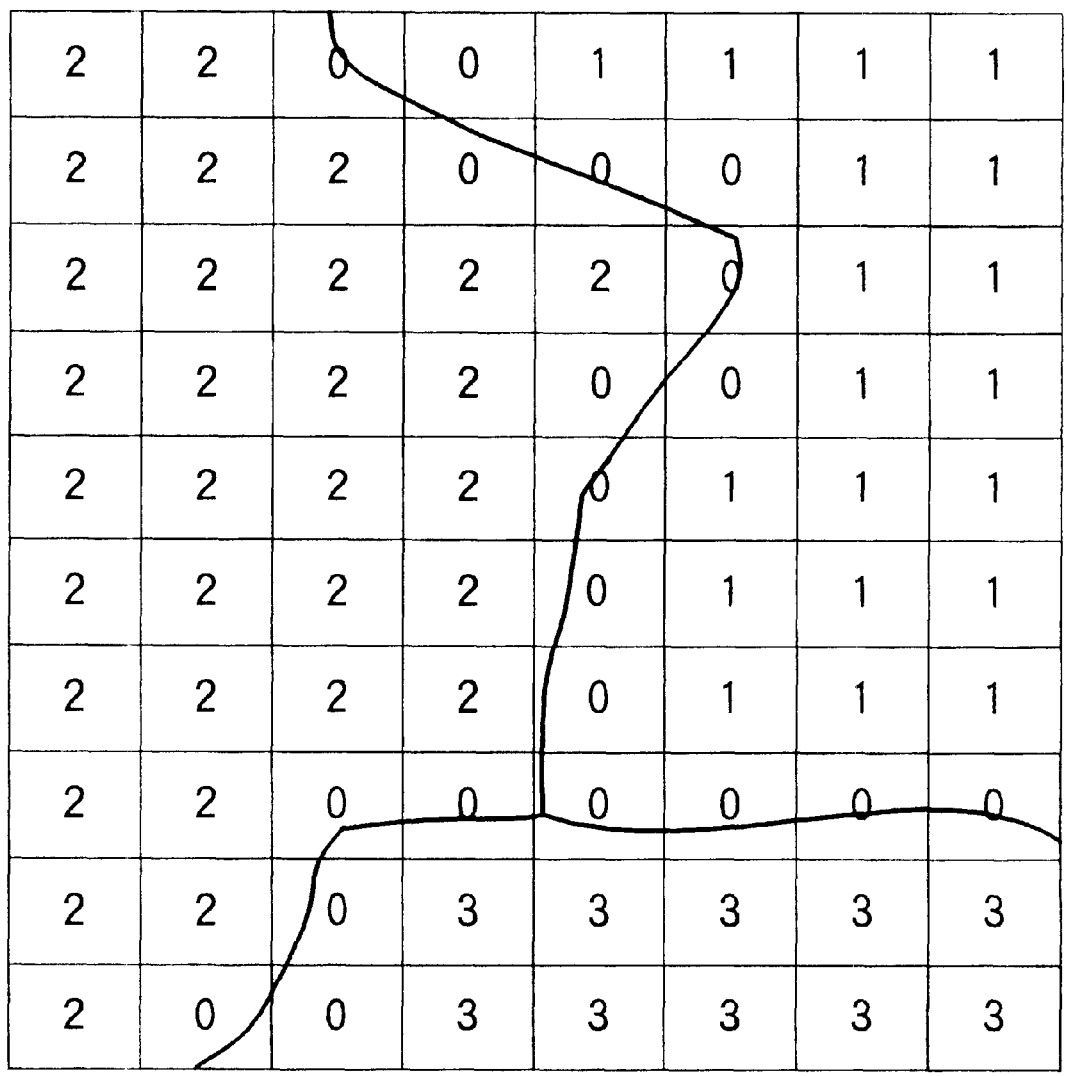
FIG. 7 is a drawing showing the classification numbers of blocks of a German disk according to the second embodiment.
Figure 8:
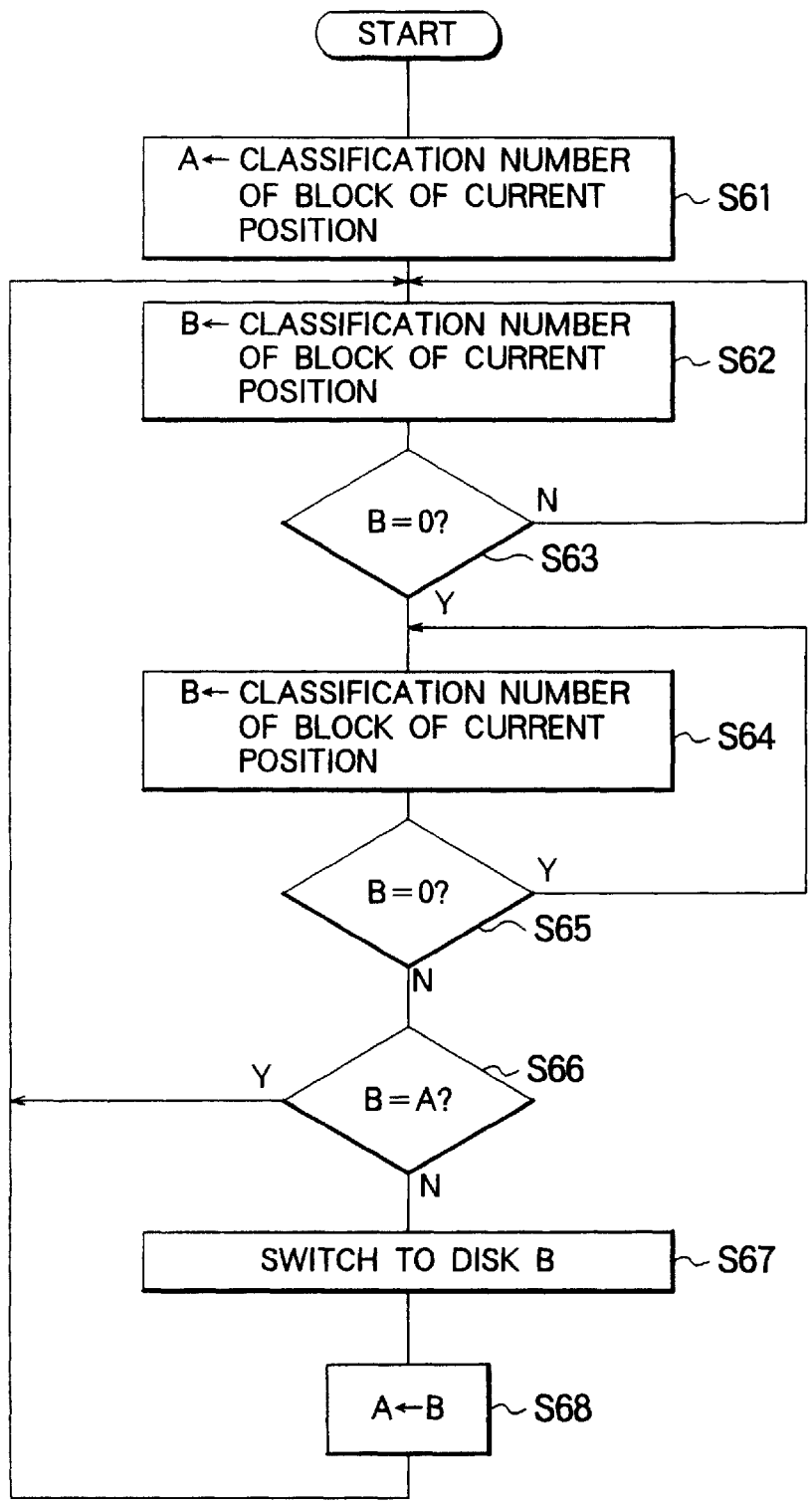
FIG. 8 is a flow chart showing the route setting operation of a control circuit according to the second embodiment.

The map information is divided into a plurality of blocks in the form of a matrix, as shown in FIG. 7, which is an enlarged, detailed diagram of part VII in FIG. 6. The classification number "0" is assigned to blocks including a border. The classification number "1" is assigned to blocks belonging entirely to the German territory, the classification number "2" is assigned to blocks belonging entirely to the French territory, and the classification number "3" is assigned to blocks belong entirely to the Swiss territory.

The French disk 42 stores the map information 421 of French territory C2 as a primary part, and map information 411 and 431 of German and Swiss territories C1 and C3 (as well as adjacent regions of other countries) as secondary part. The Swiss disk 43 stores the map information 432 of Swiss territory C3 as a primary part, and map information 411 and 421 of German and French territories C1 and C2 (as well as adjacent regions of other countries) as secondary part.

The same block classification numbers (indicating the countries to which each block belongs, or indicating that the block contains a border) are used between different disks. Since the classification numbers written into a plurality of ("three" in the example under consideration) disks are common, the same data base can be used with regard to the blocks including a border in producing the disk of various countries.

The multi-disk reproduction device 4 reads from the disks of these three countries the map information of the country designated by the control circuit 1 and the classification number of the block designated by the control circuit 1, and supplies them to the control circuit 1.

A display device 5 displays a map, the current position, and the like under the control of the control circuit 1. A voice generator 6 generates voice guiding the route and the like under the control of the control circuit 1.

RAM 8 stores data required for the operation of the control circuit 1 such as the current position detected by the GPS position detector 3, the position of the user's home, the positions including the starting point, destination, passing points, and the like of the scheduled traveling route.

An input device 9 of this embodiment is provided with a key for the operation of designating a disk to be reproduced, scroll keys for scrolling a display in eight directions, and the like.

The operation of the control circuit 1 having the above-mentioned configuration according to the second embodiment is described.

In the following description, "A" indicates a variable indicating the classification number of a block at the beginning and, "B" indicates a variable for indicating the classification number of a block of the current position. If the block includes a border, the classification number of the block is "0", if the block belongs entirely to the German territory, the classification number of the block is "1", if the block belongs entirely to the French territory, the classification number is "2", and if the block belongs entirely to the Swiss territory, the classification number of the block is "3". These variables are temporarily stored in registers (not shown) in the control circuit 1.

It is assumed herein that the German disk 41 is initially selected, and that the current position at the beginning is in a block belonging entirely to the German territory.

First, the control circuit 1 stores the classification number of the block of the current position detected by the GPS position detector 3 as the variable "A" (S61), so "A" is set to "1" (in the assumed situation).

Then, the classification number of the block of the current position detected by the GPS position detector 3 is stored as the variable "B" (S62), so "B" is set to "1" (in the assumed situation). Then, the control circuit waits until the classification number of the block of the current position is equal to "0" due to the movement of the vehicle (loop formed of N at S63 and an S62). In other words, the control circuit waits until the vehicle moves into a block including a border. Once the vehicle moves into a block including a border (Y at S63), the control circuit then waits until the vehicle subsequently moves into a block which does not include a border (loop formed of Y at S65 and an S64). When the vehicle moves into a block which does not include a border (N at S65), it is checked whether the classification number "B" of the block of the current position is equal to the classification number "A" of the block at the beginning (S66). If they are equal, the procedure is returned to S62. If they are not equal, the disk is switched so that the disk which stores the country number equal to the variable "B" is selected (S67). Then, the variable "A" is changed to be equal to the variable "B" (S68). If the vehicle moves from the German territory to the French territory, for example, the German disk 41 is replaced by the French disk 42, and the number of the current position at the beginning is switched into the one for the French territory.

In the above description, "A" is set to "1" at S61. There is also a case where A is "0", i.e., where the current position at the beginning is in a block including a the border. In this case, when the vehicle subsequently moves into a block which does not include a border, a disk which stores, as a primary part, the map information of the block into which the vehicle has moved is selected ("N" at S66 and S67).

In this way, a block including a border is recognized, and a disk of an area to which the vehicle has moved after having passed one or more blocks including a border is automatically selected. This makes it possible to provide detailed map information and service information.

Figure 9:
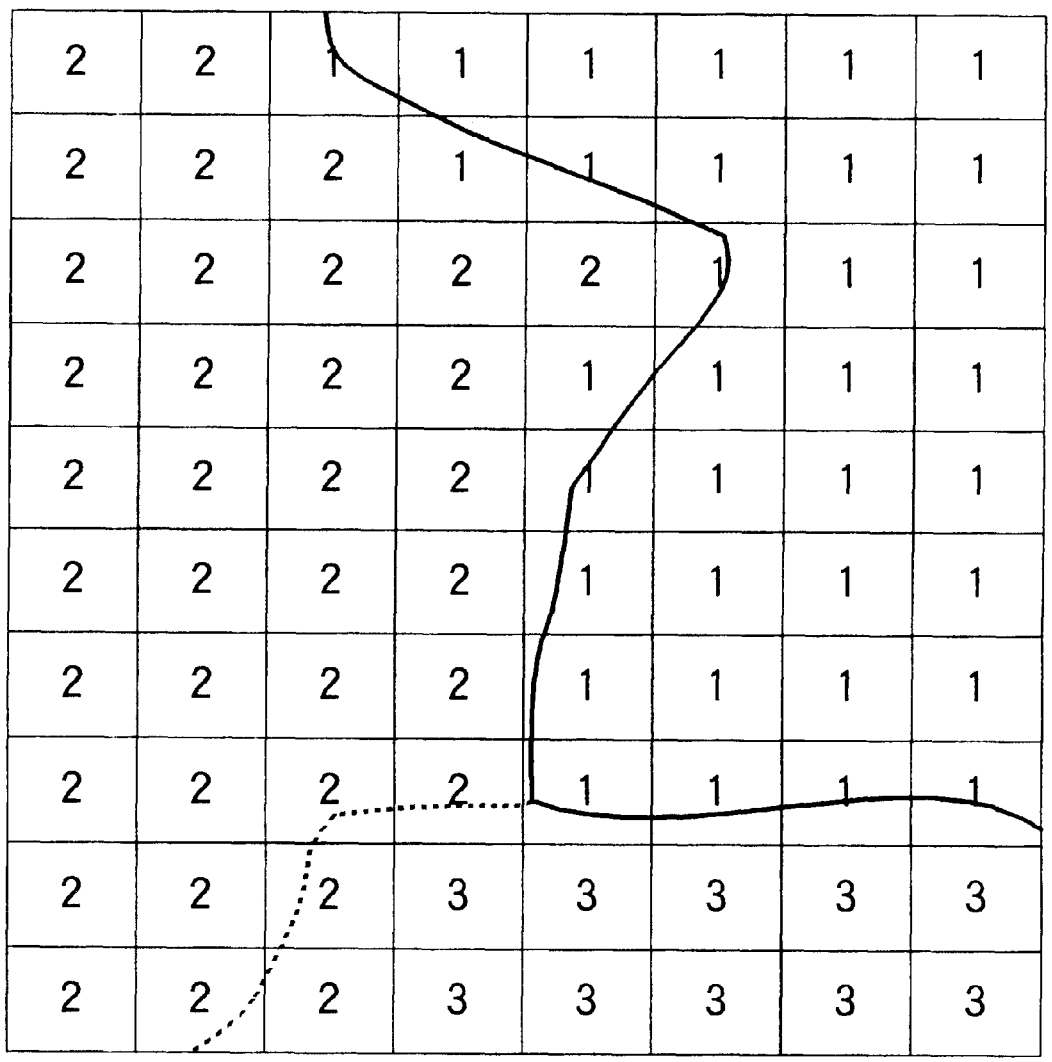
FIG. 9 is a drawing showing the classification numbers of blocks of a German disk according to a third embodiment.

Next, a third embodiment is described. The block diagram of the third embodiment is the same as FIG. 5. The operations of the control circuit 1, i.e., the programs which are stored in the ROM 2 are different from those in the second embodiment. Further, blocks including a border is not assigned "0" but the classification number of the primary country. For example, in the case of the German disk 41, "1" is assigned to all the blocks belonging (entirely or partly) to the German territory, as shown in FIG. 9.

Figure 10:
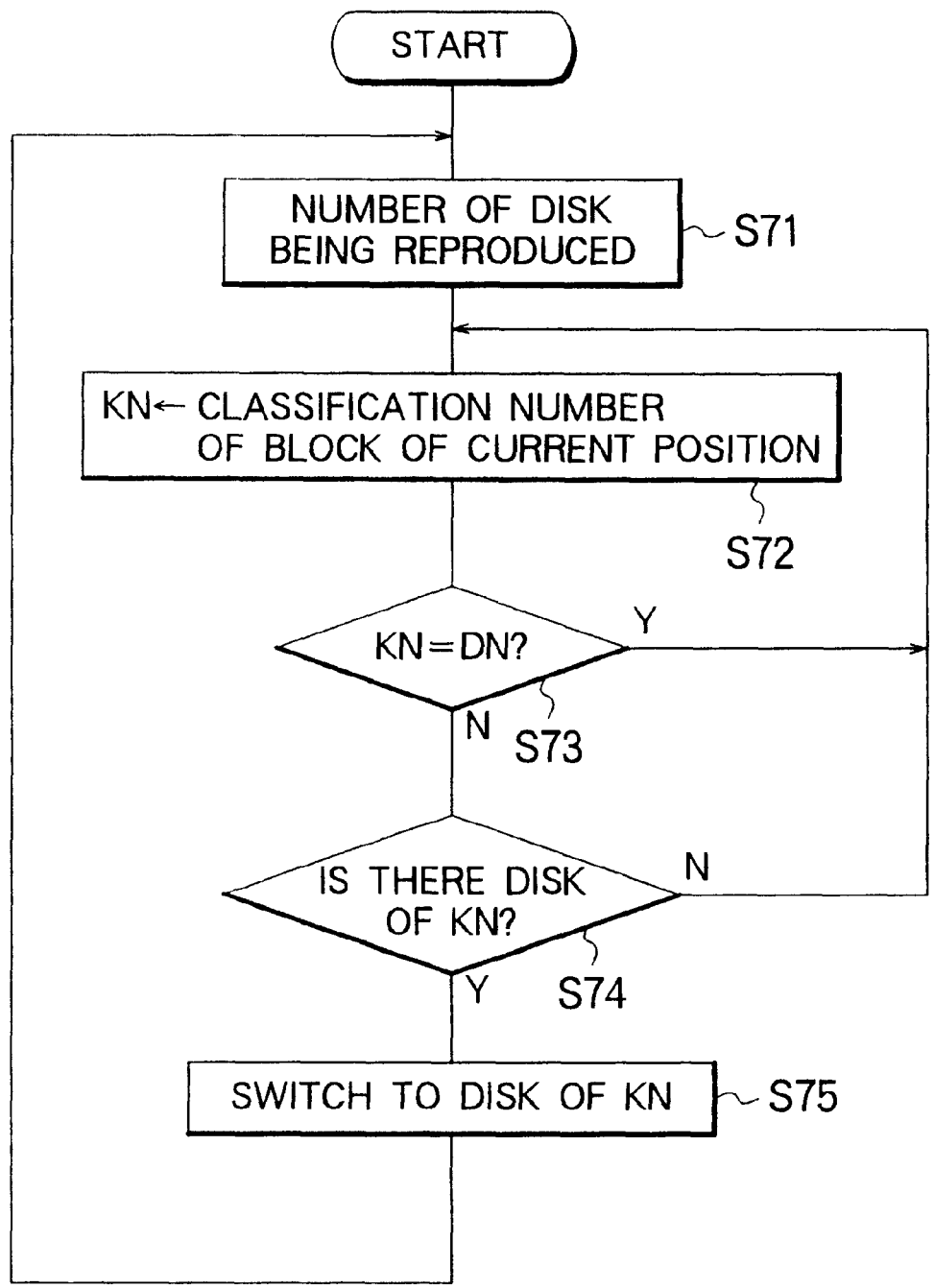
FIG. 10 is a flow chart showing the route setting operation of a control circuit according to the third embodiment.

FIG. 10 is a flow chart showing the operations of the control circuit 1 according to the third embodiment, and description thereof will be made next.

"DN" represents a variable indicating the country number of a disk being selected. When the German disk 41, "DN" is set to "1". When the French disk 42 is selected, "DN" is set to "2". When the Swiss disk 43 is selected, "DN" is set to "3". "KN" represents a variable indicating the classification number of a block of the current position. When the vehicle is in a block including a border, "KN" is set to "0". When the vehicle is in a block which belongs entirely to the German territory, "KN" is set to "1". When the vehicle is in a block which belongs entirely to the French territory, "KN" is set to "2". When the vehicle is in a block which belongs entirely to the Swiss territory, "KN" is set to "3". These variables are temporarily stored in registers (not shown) in the control circuit 1.

First, the country number of a disk being reproduced is stored as the variable DN (S71). Then, the classification number of a block of the current position detected by the GPS position detector 3 is stored as the variable "KN" (S72), and it is checked whether it is equal to the variable "DN"

(S73). If it is equal to the variable "DN", the procedure is returned to S62. If it is not equal to the variable "DN", it is checked whether a disk of the country of the variable "KN" is inserted or not (S74). If the disk is not inserted, the procedure is returned to S62. If the disk of the country of the variable "KN" is inserted, this disk will be reproduced.

In this way, in the third embodiment, when it is detected that the vehicle has moved to a block which is only a secondary part in the currently selected disk (i.e., the currently selected disk stores the map information of the block of the current position only as a secondary part), the multi-disk reproduction device switches to a disk in which the block of the current position is a primary part (i.e., which stores the map information of the block of the current position as a primary part). Thus, detailed map information and service information can be thereby obtained.

According to the second and third embodiments, since a disk storing, as a primary part, the information of the block in which the vehicle is currently positioned is always selected, detailed map information and service information can be always obtained.

What is claimed is:

1. A navigation device comprising:
   a current position detector for detecting a current position of a vehicle;
   a map information reproduction device for reading map information from a medium which stores the map information;
   a display device; and
   a control circuit for causing the map information read by the map information reproduction device to be displayed on the display device, initiating enlarged display of an intersection of which the vehicle approaches to within a predetermined distance, and terminating the enlarged display when a predetermined condition has been satisfied;
   wherein the control circuit continues the enlarged display of the intersection if the speed of the vehicle is not more than a predetermined value, even though the predetermined condition has been satisfied.

2. The device according to claim 1, wherein said predetermined condition is
   that the vehicle moves away from the intersection farther than a predetermined distance;
   that the vehicle moves at a speed greater than a predetermined speed, after passing the intersection; or
   that a predetermine time has passed after the vehicle has passed the intersection.

3. A navigation device comprising:
   a current position detector for detecting a current position of a vehicle;
   a map information reproduction device for reading map information from a medium storing the map information;
   a display device;
   a control circuit for directing display of the map information read from the map information reproduction device and the current position detected by the current position detector on the display device; and
   a scroll key for scrolling a display screen in a designated direction;
   wherein the control circuit directs scrolling of the screen based on an operation of the scroll key, and directs enlarged display of an intersection when the intersection is brought by scrolling, to within a predetermined area of the screen.

4. A navigation device comprising:
   a current position detector for detecting a current position of a vehicle;
   a map information reproduction device for reading map information from a medium storing the map information including information about road classifications;
   a display device; and
   a control circuit for directing display of the map information read from the map information reproduction device and the current position detected by the current position detector on the display device;
   wherein when a boundary with a road of a different classification, than the classification of the road traveled on lies ahead in a moving direction of the vehicle, the control circuit directs enlarged display of the boundary when the vehicle comes within a predetermined distance of the boundary.

5. A navigation device comprising:
   a current position detector for detecting a current position of a vehicle;
   a map information reproduction device for reading map information from a medium storing the map information;
   storage means for storing a planned route;
   a display device;
   a control circuit for directing a route guidance display operation of displaying the map information read from the map information reproduction device, the planned route stored in the storage means, and the current position detected by the current position detector on the display device, a simulated travel display operation of displaying the planned route to be stored in the storage means and a virtual current position on the planned route on the display device with a predetermined procedure and a predetermined speed, and enlarged display of an intersection in a position of the vehicle near the intersection during the route guidance display operation and the simulated travel display operation; and
   an exclusion key for designating, during the simulated travel display operation, an intersection to be excluded from the enlarged display;
   wherein, during the route guidance display operation, the control circuit does not direct enlarged display of the intersection designated by the exclusion key at the time of the simulated travel display operation.

6. A navigation device comprising:
   storage means for storing a planned route;
   a display device; and
   a control circuit for directing a simulated travel display operation of displaying the planned route to be stored in the storage means and a virtual current position on the planned route on the display device with a predetermined procedure and a predetermined speed, and enlarged display of an intersection at the time when the vehicle is near the intersection during the simulated travel display operation, wherein
      during the enlarged display of the intersection the control circuit directs lowering of the moving speed of or temporary stopping of the vehicle during the simulated travel display operation.

* * * * *